May 27, 1969 T. DE HAAS ET AL 3,447,085

SYNCHRONIZATION OF RECEIVER TIME BASE IN PLURAL FREQUENCY DIFFERENTIAL PHASE SHIFT SYSTEM

Filed Jan. 4, 1965

INVENTORS
THIJS deHAAS
MARTIN B. GRAY
JOSEPH P. WELSH

BY

Martin LuKacher

ATTORNEY

INVENTORS
THIJS deHAAS
MARTIN B. GRAY
JOSEPH P. WELSH
BY
ATTORNEY

INVENTORS
THIJS de HAAS
MARTIN B. GRAY
JOSEPH P. WELSH
BY
ATTORNEY

INVENTORS
THIJS deHAAS
MARTIN B. GRAY
JOSEPH P. WELSH
BY [signature]
ATTORNEY

United States Patent Office 3,447,085

Patented May 27, 1969

3,447,085

SYNCHRONIZATION OF RECEIVER TIME BASE IN PLURAL FREQUENCY DIFFERENTIAL PHASE SHIFT SYSTEM

Thijs De Haas, Martin B. Gray, and Joseph P. Welsh, Rochester, N.Y., assignors to General Dynamics Corporation, a corporation of Delaware Filed Jan. 4, 1965, Ser. No. 423,192
Int. Cl. H04b *1/16;* H04l *7/04, 27/24*
U.S. Cl. 325—320 18 Claims

ABSTRACT OF THE DISCLOSURE

A receiving terminal for a frequency differential phase shift keyed data communication system is disclosed. The terminal includes a channel for synchronizing the receiver time base with the time base of the signal elements which are received after transmission across a radio link wherein they may be subjected to phase shift or differential delay due to the propagation characteristics of the link. At the receiving terminal, a function and timing generator produces signals related in frequency to the frequency of the receiver time base. These locally generated signals and the received information tones are combined with each other and correlated so as to derive output signals which vary in accordance with the phase difference between the received signal elements and the receiver time base. These output signals are applied to decision circuits which produce command signals. The command signals are used to control the frequency of the receiver time base by effectively adding or subtracting pulses from a high frequency pulse train which is derived from a frequency standard, thereby producing a receiver time base whose phase accurately corresponds to the signal element period.

This invention relates to communications systems, and particularly to demodulation apparatus for use in a communications system.

The invention is especially suitable for use in communication systems wherein information is transmitted in discrete time blocks and may be advantageously used in a communication system using phase coding of a plurality of different frequency signals, such as of the type described in Franco et al., Patent No. 3,036,157, issued May 22, 1962.

In many communications systems, each transmitted signal element, by which is meant the signal transmitted in a discrete time block, may represent an item of information, say a binary data bit. Successive information items may be represented by signal elements which follow one another in adjacent time blocks. The signal elements are desirably processed separately at the receiving point, as by sampling, comparison or correlation techniques, in order to derive the information represented by an individual signal element. When two signal elements are processed concurrently, information derived may be in error because the signal elements may represent two opposite types of information. Accordingly, it is desirable that signal processing at a receiving point be done in synchronism with the incoming transmitted signals.

Some techniques have been developed which use an incoming signal for synchronizing the demodulation process. Exemplary of these techniques is the use of an oscillator that is phase locked to a pilot tone which is contained in the incoming signal. The pilot tone is synchronous with the signal elements which are transmitted. The tone, however may not be synchronous with the signal elements which are received, since the signal elements may be phase shifted or delayed differently from the pilot tone during transmission. A long distance radio link, for example, is subject to multi-path effects and typically has a time-varying propagation characteristic. Accordingly, the phase relation of the pilot tone and the signal elements may vary from signal element to signal element. If the time base of the demodulator were derived from the pilot tone, the time base would not be unambiguously identified with the proper signal element and error performance of the system would be poor. By time base is meant a periodic signal, such as a square wave, the frequency and phase of which is the basis or reference for timing of demodulation or receiver operations.

Noise picked up by the incoming signal in the course of transmission may also interfere with synchronization. Since noise pulses could occur randomly with respect to a signal element, a synchronizing unit which responded to a noise pulse might provide a time base entirely misaligned with the signal elements.

Accordingly, it is an object of this invention to provide an improved communications system.

It is a further object of the invention to provide an improved demodulation system for processing information signals to derive the information contained therein.

It is a still further object of the present invention to provide an improved communication system in which the demodulation process is maintained in synchronism with the received signal in spite of distortion thereof in transmission, as by propagation disturbances or noise.

It is a still further object of the present invention to provide an improved system for synchronizing the time base of the demodulator with the signal elements of a received signal.

It is a still further object of the present invention to provide an improved frequency differential, radio, data communications system, by which is meant a system wherein different items of information are transmitted simultaneously on a plurality of adjacent tones of different frequency in terms of the phase of difference frequency components of such tones.

It is a still further object of the present invention to provide an improved synchronization system for data communications systems which provides automatic and continuous correction of the receiver time base in accordance with variations in the received signal element duration.

Briefly described a system embodying the invention includes means at a transmitting point for transmitting a plurality of tones together with an information signal. The tones have frequencies which differ from each other. The frequency difference between adjacent tones is equal to a frequency having a period which is an integral sub-multiple of the duration of the signal elements of the information signal. At the receiving terminal, tones are generated which are approximately the same frequency as the transmitted tones. These locally generated tones therefore differ in freqeuncy by a frequency which has a period which also is an integral sub-multiple of the duration of the time base of the receiver. The locally generated tones and the transmitted tones are combined and compared with each other, as by correlation techniques, to derive signals which vary in accordance with the relative delay of the time base and the signal element. Means are also provided at the receiving point for digitally analyzing the signals and deriving outputs for controlling a local time base generator to provide a time base which is synchronous with the signal elements of the transmitted information signal. Since the comparison of the locally generated and transmitted tones may be carried on continuously, the receiver time base is synchronized with the signal elements in spite of phase shifts or delays due to perturbations in the course of transmission from the transmitting point to the receiving point.

The invention itself, both as to its organization and method of operation, as well as additional objects and advantages thereof will become more readily apparent from a reading of the following description in connection with the accompanying drawings in which:

FIG. 1 is a simplified block diagram of a system provided in accordance with the present invention which may be located at a receiving terminal;

FIGS. 2*a*, *b*, and *c*, taken together as shown in FIG. 2*d*, is a block diagram of the receiving terminal time base synchronizing system which is part of the system shown in FIG. 1;

Figure 1:
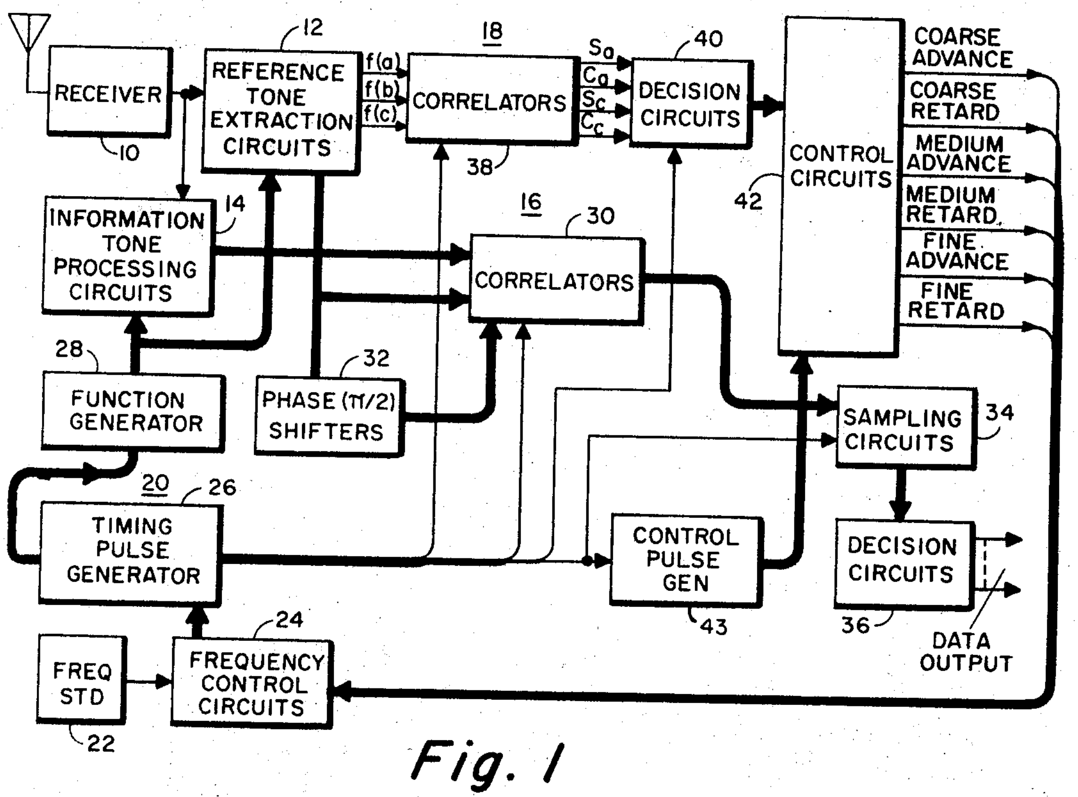

Referring more particularly to FIG. 1, there is shown a receiver 10 which may be a high frequency radio communications receiver which derives audio frequency signals containing the components of a transmitted signal which may have been transmitted over a long distance radio link from a transmitting point. The transmitter system which is located at the transmitting point may be a frequency differenial, phase coded transmission system of the type which is described in the above referenced Franco et al. patent. This transmitter system provides a plurality of signal components of different frequency. These have frequencies which differ from each other by a certain difference frequency, $\Delta f_T$. The $\Delta f_T$ frequency is an integral submultiple of the component frequencies. Also, the signal elements of the signal have an interval $T_T$ which is equal to the period of the difference frequency, i.e., $T_T=1/\Delta f_T$. At least three of the frequency components of the transmitted signal, $f_a$, $f_b$, and $f_c$ are unmodulated and are called reference or pilot tones. These components are utilized to synchronize the time base of the receiver with the signal element as will be explained more fully hereinafter.

Figure 7:
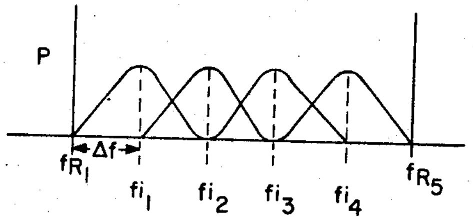
FIG. 7 is a curve showing the energy distribution of a group of tones which is contained in the transmitted information signal adapted to be received by the system shown in FIG. 1.

FIG. 7 illustrates the power spectrum of a portion of the transmitted information signal components. $f_{R_1}$ and $f_{R_5}$ represent reference frequency components or tones which are unmodulated. The information tones or modulated components are indicated as $f_{i_1}$, $f_{i_2}$, $f_{i_3}$, and $f_{i_4}$. These information tones are separated from the reference tones and from each other by the difference frequency $\Delta f_T$. The phase of the information tones with respect to their adjacent reference tones, during a signal element interval, is a function of the digital information represented by that component during that interval.

The $f_{R_1}$ and $f_{R_5}$ reference tones may be suitable for use as two of the pilot tones for synchronizing purposes. An unmodulated tone having the same frequency position as $f_{i_1}$ may be used as the other pilot tone. In other words the pilot tones $f_a$, $f_b$, and $f_c$ may have the same frequency relationship as $f_{R_1}$, $f_{i_1}$ and $f_{R_5}$ respectively. $f_a$ may for example have a frequency of 375 cycles per second (c.p.s.). $f_b$ may have a frequency of 400 c.p.s. and $f_c$ may have a frequency of 500 c.p.s, it being assumed that the difference frequency $\Delta f_T$ is 25 c.p.s. The receiver 10 provides at its output a composite signal including the reference and pilot tones and the information tones.

The composite signal is applied to reference tone extraction circuits 12 and information tone processing circuits 14. The reference tone extraction circuits operate to derive reference tones, such as $f_{R_1}$ and $f_{R_5}$ (FIG. 7) which are fed into an information channel 16 including the information tone processing circuits 14. The reference tone extraction circuits also provide control signals, $f(a)$, $f(b)$, and $f(c)$, which are utilized in a synchronizing channel 18 which includes the reference tone extraction circuits 12. The synchronizing channel 18 provides control signals to a timing and function generator system 20 which, among other things, generates the receiving system time base. The control signals synchronize the time base with the signal elements of the received signal.

A frequency standard 22, which may be a crystal controlled oscillator, supplies signals to frequency control circuits 24. These circuits 24 provide pulses for operating a timing pulse generator 26 and a function generator 28. Briefly, the control circuits 24 include digital logic circuits for so adjusting the frequency of a signal which is derived from the frequency standard that the receiver system time base is synchronized and in phase with the signal elements. The signal element may however vary in its time position due, for example, to the time varying propagation characteristic of the radio link. The frequency control circuits respond to such variations and delay or phase shift the signals which are applied to the function generator 28.

The function generator derives from the frequency control circuits, a plurality of different frequencies $f_1 \ldots f_n$ which may be separated in frequency by the same difference frequency as the received tones, i.e., $\Delta f_R$. $\Delta f_R$ is 25 c.p.s. in the case selected for illustration herein. These frequencies are applied to the reference tone extraction circuits 12 and the information tone processing circuits 14 for frequency conversion purposes. Oscillators or resonant circuits which are synchronized or excited by the pulses generated in the frequency control circuit may be used to generate the different frequencies.

The information tones and the reference tones are desirably converted in frequency so that each reference tone is of the particular frequency and each information tone is at that frequency. The tones may also be converted in frequency by heterodyning them with the function generator output signals in the extraction and processing circuits 12 and 14. By way of example the particular frequency may be 1250 c.p.s.

Correlators 30 are provided in the information channel 16; a pair of correlators being provided for each information tone $f_{i_1}$, $f_{i_2}$, $f_{i_3}$, and $f_{i_4}$ shown in FIG. 7. To one of these correlators, say for the $f_{i_1}$ tone, is applied the information tone signal from the information tone processing circuits 14. The reference tone $f_{R_1}$, suitably translated in frequency in the reference tone extraction circuits 12, is also applied to this correlator. The other of the pair of correlators for the $f_{i_1}$ tone receives the same information tone signal from the information tone processing circuits 14. The reference tone $f_{R_1}$, after being shifted in phase $\pi/2$ radians or 90° in one of a plurality of phase shifters 32 to which the reference tones are applied, is also applied to the other of the correlators for the $f_{i_1}$ tone. Similarly, a pair of correlators are provided for each of the other information tones, and reference tones obtained from the extraction circuits 12 are applied to these correlators, half of the number of correlators receiving the reference tones after passing through the phase shifters 32.

The correlators 30 themselves may be circuits which effectively multiply the signals applied thereto and integrate them over the signal element interval. The timing pulse generator 26 controls the correlators so that the integrating interval is equal to the receiver time base interval which is synchronized and in alignment with the signal element by virtue of the frequency control circuits 24. A suitable correlator circuit is described hereinafter in connection with FIG. 4.

The output of each of the correlators 30 is applied to sampling circuits 34. These sampling circuits may be relay circuits of the type described in the Franco et al. patent mentioned above. Alternatively, they may be circuits which provide digital outputs for example a binary "1" or "0" bit, respectively indicating whether the signal produced by each correlator is positive or negative at the end of each signal element interval. The sampling pulses, which are derived from the pulse generator 26 just prior to the end of the signal element interval, time the operation of the sampling circuits to sample the correlator 30 outputs at the proper instant.

The output signals from the sampling circuits 34 are applied to decision circuits 36. These circuits 36 may include a diode matrix, such as described in the Franco et al. patent for translating the digital outputs of the sampling circuits into a plurality of data bits corresponding to the character of data which is represented by the information tones which are transmitted during each signal element interval. These bits may be in the form of voltage levels for operating a teleprinter. The data may be subjected to further digital processing as by recording on magnetic or punched paper tape or fed to a digital computer.

The synchronizing channel 18 also includes a plurality of correlators which correlate the control signals $f(a)$, $f(b)$ and $f(c)$ with each other. The correlators 38 may be similar to those used for the correlators 30, a suitable circuit being shown in FIG. 4.

The output of the correlators 38 are signals $S_a$, $C_a$, $S_c$ and $C_c$ which vary in amplitude and polarity as a function of cosine and sine of the phase difference between the signal element and the time base. The correlator outputs $S_c$ and $C_c$ respectively represent a signal which has a frequency which is an integral multiple of the signal element and time base repetition frequencies. In the illustrated system this integral multiple may be five (5). The outputs $S_c$ and $C_c$ of this integral multiple frequency will therefore experience five complete cycles for a single complete cycle of the outputs $S_a$ and $C_a$ which represent the cosine and sine of the phase difference between the time base and the signal element themselves. Accordingly, the signals $S_c$ and $C_c$ are utilized to provide fine synchronization control of the time base, while $S_a$ and $C_a$ provide coarse synchronization control.

Decision circuits 40 are provided for determining the relative and absolute magnitudes of the signals $S_a$, $C_a$, $S_c$ and $C_c$ during each signal element interval. These decision circuits may include sampling circuits, similar to the sampling circuits 34, which convert the input signals $S_a$, $C_a$, $S_c$, $C_c$ into digital signals.

The decision circuits may also include digital circuits for processing these digital signals so as to discriminate against noise. After digital processing the signals are applied to control circuits 42 which may be digital logic circuits for applying control pulses from a control pulse generator 43, which produces pulses timed by the timing pulse generator 26, to the frequency control circuits 24. These control pulses may effectively control the frequency of the output signals from the frequency standard 22 in a coarse, medium or fine manner thereby advancing or retarding the time base which is generated by the frequency control circuits with respect to the signal elements so that the time base is synchronized with the signal elements.

Figures 2A, 2D:
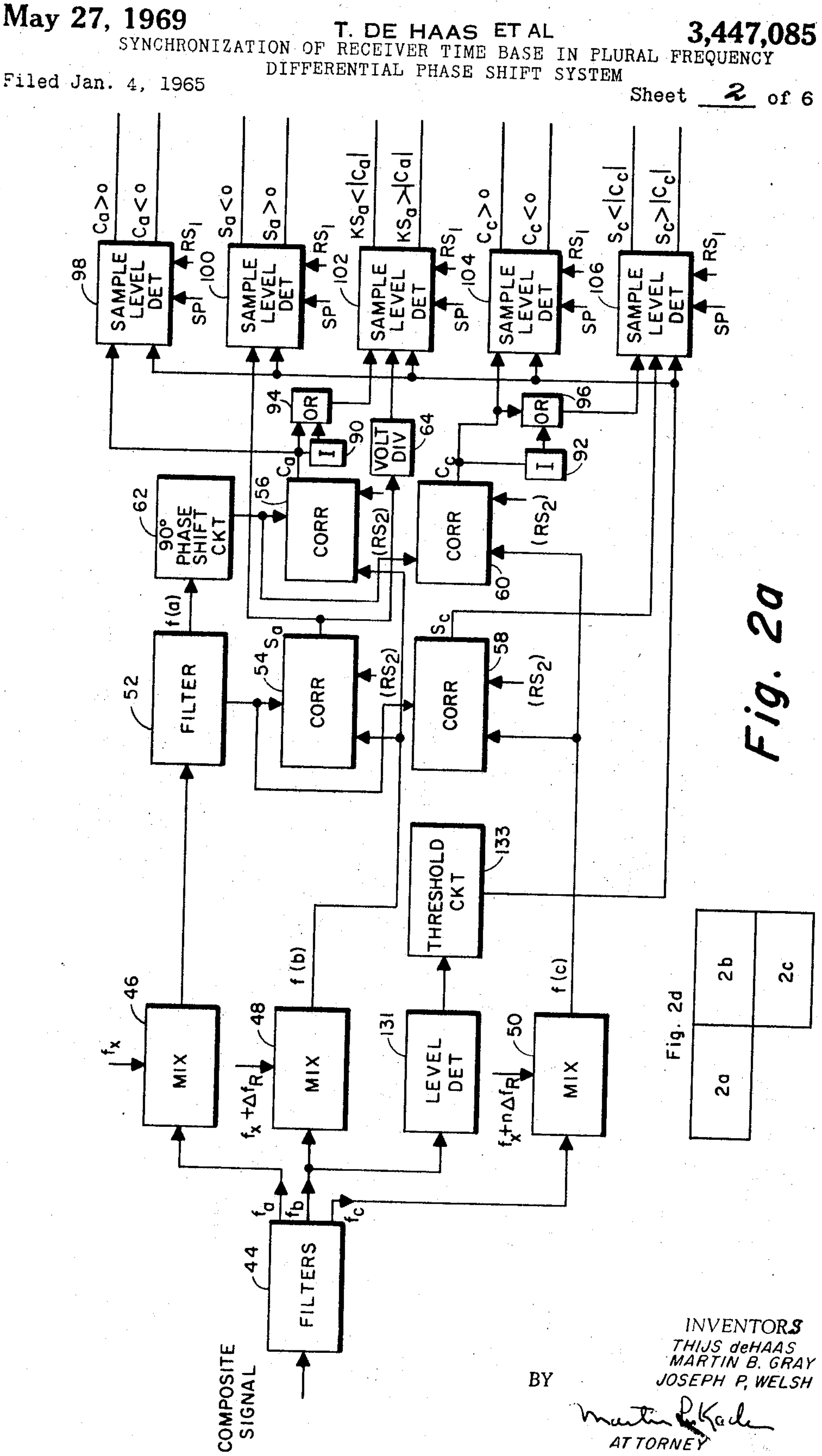
Figure 2B:
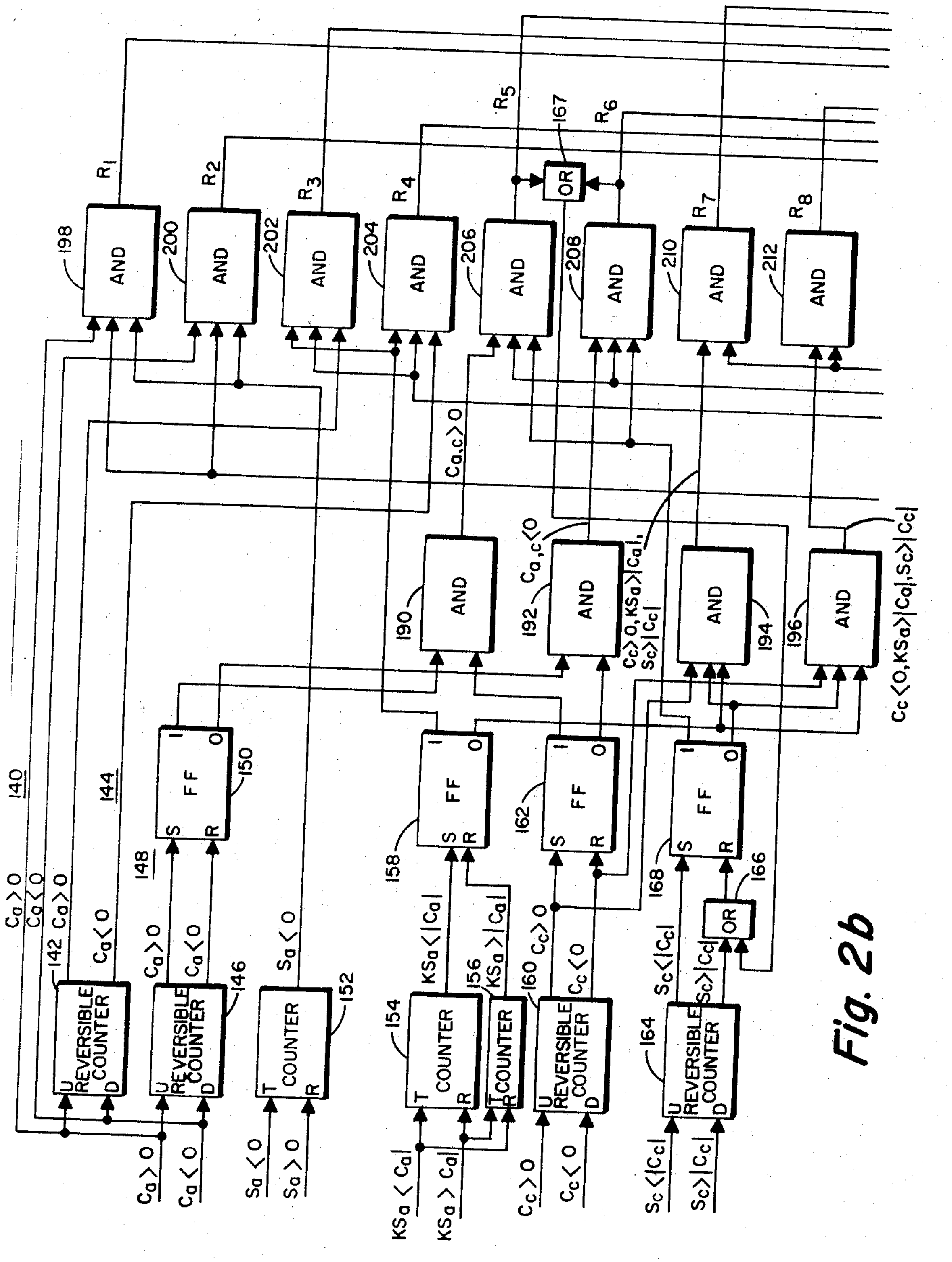
Figure 2C:
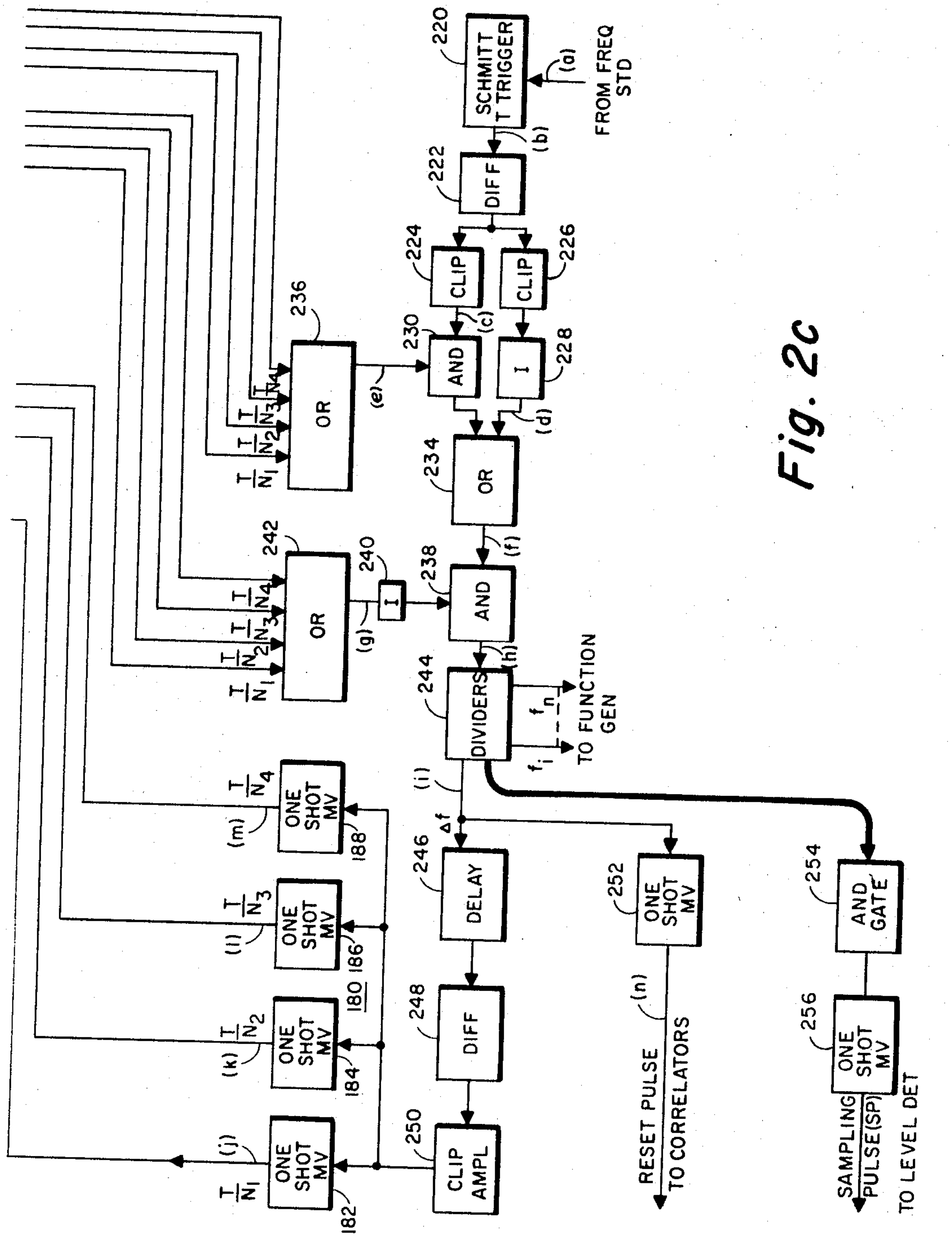

The synchronization channel 18 and the frequency control circuits 24 are shown in greater detail in FIG. 2. The composite signal from the receiver 10 is applied to filters 44 which separate and extract the pilot tones $f_a$, $f_b$, and $f_c$. As mentioned above these pilot tones may, for example, have frequencies of 375 c.p.s., 400 c.p.s., and 500 c.p.s. Mixer circuits 46, 48, and 50 are provided for deriving signals $f(a)$, $f(b)$ and $f(c)$ which are functions of the received pilot tones and the locally generated signals and contain information as to the phase of the receiver time base and the phase of the signal elements. These locally generated signals may be derived from the function generator 28 (FIG. 1). The mixer 46 has applied thereto a locally generated signal of frequency $f_x$, as by the timing and function generator 20. The frequency $f_x$ may be 1625 c.p.s. so that the lower sideband frequency resulting from the heterodyning of $f_a$ and $f_x$ in the mixer 46 has a frequency of 1250 c.p.s., which is the frequency at which the correlators are designed to operate. The lower sideband frequency is extracted by means of a filter 52 and provides the control signal $f(a)$.

The mixer 48 receives as inputs the tone $f_b$, which may be 400 c.p.s., and a signal having the frequency $(f_x+\Delta f_R)$ where $\Delta f_R$ is the frequency of the receiver time base. In the illustrated case this frequency is approximately 25 c.p.s. which is the same as the repetition frequency of the signal elements. The frequency $(f_x+\Delta f_R)$ is therefore 1650 c.p.s. The lower sideband frequency of the mixer output provides the control signal $f(b)$ which also has a frequency of 1250 c.p.s. $f_c$ is higher than $f_a$ by 125 c.p.s. in the illustrated case. This signal $f_c$ is mixed with a signal having a frequency $(f_x+n\Delta f_R)$, where $n$ is equal to five. Accordingly, $(f_x+n\Delta f_R)$ is equal to 1750 c.p.s. The lower sideband frequency which is the frequency of the control signal $f(c)$ is also 1250 c.p.s. Accordingly, the lower sideband control signal $f(a)$ may be represented by the following equation:

$$f(a)=A\ \sin\{2\pi(f_x-f_a)t+\theta_x-\theta_a\}$$

where $\theta_x$ is equal to the phase angle of $f_x$ and $\theta_a$ is equal to the phase angle of $f_a$. The lower sideband component represented by the control signal $f_b$ may be expressed by the following equation:

$$f(b)=A\ sin\{2\pi\ (f_x-f_a)\ t+\theta_x-\theta_a+\varphi_R-\varphi_T\}$$

where $\varphi_R$ is the phase angle of the receiver time base and $\varphi_T$ is the phase angle of the transmitted signal element. The output control signal $f(c)$ which represents the lower sideband of the produce of the mixer 50 may be represented by the following equation:

$$f(c)=A\ sin\ \{2\pi\ (f_x-f_a)\ t+\theta_x-\varphi_a+n(\varphi_R-\varphi_T)\}$$

where $n$ is the integral multiple of the time base and signal element frequency which was taken in the illustration to be five. In other words, the functions $f(a)$, $f(b)$ and $f(c)$ are the same except for the phase difference angles $(\phi_R-\phi_T)$ or $n(\phi_R-\phi_T)$.

The control signal $f(a)$ is correlated with the control signals $f(b)$ and $f(c)$ in four correlator circuits 54, 56, and 58 and 60 to derive the signals $S_a$, $C_a$, $S_c$ and $C_c$ which are functions of the sine and cosine of the phase difference $(\phi_R-\phi_T)$ between the time base and the signal element, or the sine and cosine of $n$ times this phase difference. The correlators 54 and 58 are sine correlators which derive the output $S_a$ which varies in accordance with the cosine of this phase difference and $S_c$ which varies in accordance with the cosine of $n$ times this phase difference. A sine correlator is a correlator to which the reference input signal is a sine function and a cosine correlator is a correlator in which the reference input signal is a cosine function. The output of a sine correlator is a function of the cosine of the phase difference between the reference and that component of another input signal which is of the same frequency. It will be observed that the output is a maximum when the phase difference is zero, i.e. cosine of zero degrees is a maximum of a cosine function. Conversely a cosine correlator is one which has a cosine function reference input signal and an output which is a sine function of the phase difference between the reference and another input signal. $f(a)$ is taken as the reference input signal. The control signal $f(a)$ is shifted in phase 90° by means of the phase shift circuit 62 and applied to the correlators 56 and 60 which serve as cosine correlators to respectively provide the signals $C_a$ and $C_c$ corresponding to the sine of the phase difference and the sine of $n$ times the phase difference. The correlators are reset after each time base interval by a reset pulse which is applied to a reset input thereof.

Figure 3:
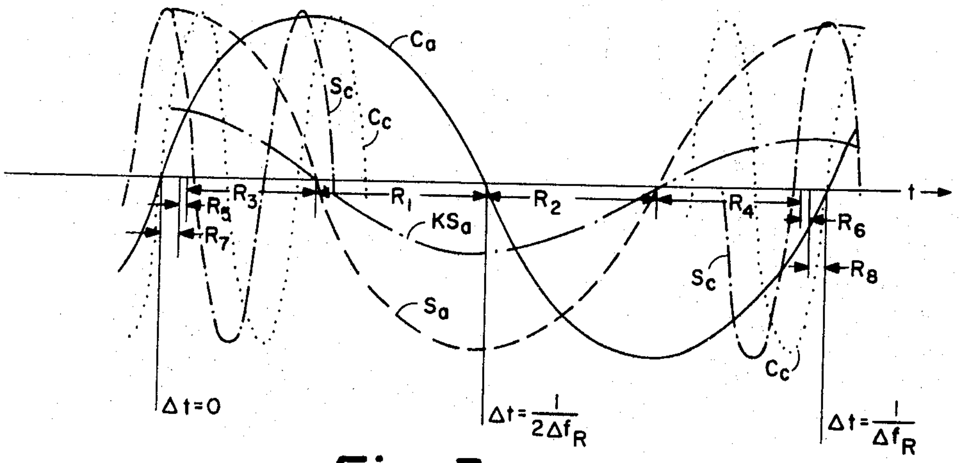
FIG. 3 is a family of curves illustrating the operation of the system shown in FIG. 2.

Referring to FIG. 3, the curve labeled $S_a$ is a plot of the output of the correlator 54 at the instant before it is reset with increasing phase difference ($\phi_R-\phi_T$) over a receiver time base cycle ($\Delta t=0$ to $\Delta t=1/\Delta f_R$). $f(b)$ is correlated in the correlator 56 with $f(a)$ after $f(a)$ is shifted 90° in the phase shift circuit 62 to provide a cosine function. Accordingly, the output of the correlator 56 with increasing phase difference ($\phi_R-\phi_T$) is a sine function of that phase difference, as indicated by the solid line curve $C_a$ in FIG. 3.

In the correlator 58, the function $f(a)$ is correlated with the function $f(c)$. It will be noted that these functions differ only by the phase angle $n(\phi_R-\phi_T)$. Accordingly, the output of the correlator taken at the instant before the end of correlation interval (just after a time base interval) varies as the cosine of this phase angle. In the exemplary case, where $n$ is equal to five, $S_c$ executes five cycles for each cycle of $S_a$. The curve made up of dots and dashes and indicated by the designation $S_c$ is a plot of the output of the correlator 58 with increasing time base signal element phase difference over a time base cycle. Only the first and last cycles of this curve are shown to simplify FIG. 3. Since $f(a)$ is shifted in phase 90° in the circuit 62, the correlator 60 is a cosine correlator and its output $C_c$ follows the sine of the angle, $n(\phi_R-\phi_T)$. The sine wave represented by the dotted curve designated $C_c$ in FIG. 3 is a plot of the outputs of the correlator 60 taken at instants prior to reset of the correlator for increasing time base-signal element phase difference over a time base cycle. The output $S_a$ is applied to a voltage divider 64 which provides a voltage output equal to $KS_a$ where K is less than one (1). In the illustrated case K may be approximately 0.4. The divided $S_a$ signal is illustrated in FIG. 3 by the curve made up of long dashes and dots and designated $KS_a$.

Figure 4:
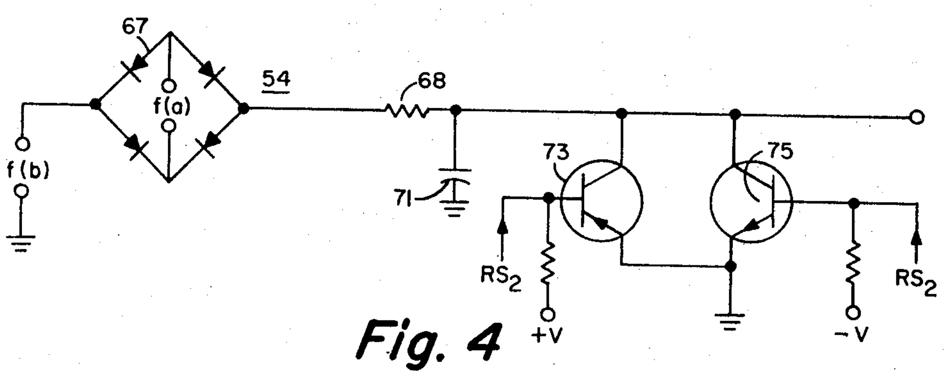
FIG. 4 is a simplified circuit diagram of a correlation circuit of the type shown in FIG. 2.

The correlator circuits 54, 56, 58, and 60 are similar. The circuit 54 is shown in FIG. 4. The circuit includes a bridge type half wave rectifier 67, across one pair of diagonals of which the control signal $f(a)$ is applied. The other control signal $f(b)$ is effectively applied across the opposite diagonals of the bridge. An integrating circuit including a resistor 68 and a capacitor 71 are connected to an apex of the bridge opposite from that to which the signal $f(b)$ is applied. The signal $f(b)$ is effectively chopped by the signal $f(a)$, since the diodes of the bridge 67 are biased in the direction to allow current to charge the capacitor only when $f(a)$ has a polarity such that the diodes are conducting. The signals $f(a)$ and $f(b)$ are effectively multiplied because of the non-linear conductivity characteristics of the diodes. The capacitor 71 is discharged at the end of the correlation interval by reset pulses $RS_2$ which are applied to the bases of transistors 73 and 75 which are connected across the capacitor 71 and which respectively carry positive and negative current. These reset pulses may be of opposite polarity corresponding to transistor conductivity type. Inverting circuits (not shown) may be used to obtain the desired polarity reset pulses. The transistors are normally cut off by bias voltages +V and −V. Accordingly, the correlator may provide a different output signal for each receiver time base interval.

The outputs of the correlators 54, 56, 58, and 60 are indicative of the phase relationship of misalignment between the signal element and the time base of the receiver, when these outputs are sampled immediately after the time base interval which is equal to the correlation interval. When the time base and the signal element are synchronized, the output $S_a$ and $S_c$ as well as $KS_a$ are positive in polarity while the output $C_a$ and $C_c$ are of zero or ground voltage level. These conditions are apparent from FIG. 3. The leading or lagging relationship of time base and signal interval is indicated by the correlator outputs. If the outputs $C_a$ and $S_a$ are in the first half of their cycle, (to the left of $\Delta t=\frac{1}{2}\Delta f_R$) the time base can be thought of as lagging the signal element; whereas when the correlator outputs $C_a$ and $S_a$ are in the second half of their cycle (to the right of $\Delta t=\frac{1}{2}\Delta f_R$), the time base can be considered as leading the signal element. The $C_a$ and $C_c$ outputs contain information sufficient to unambiguously indicate whether the receiver time base lags or leads the signal element and should be advanced or retarded in order to obtain requisite synchronization. The amount of advance or retardation required depends upon the degree of lag or lead of the time base with respect to the signal element.

FIG. 3 indicates eight zones $R_1$ to $R_8$ which are defined by different combinations of oppositely valued output voltages $C_a$, $C_c$, $S_c$, $S_a$, and $KS_a$. In zone $R_1$, the time base is lagging the signal element by more than one-quarter a signal element interval. Accordingly, a large correction is required to advance the phase of the receiver time base. The required corrections are relatively smaller in the zones $R_3$, $R_5$ and $R_7$ which successively approach the condition of alignment. Accordingly, the system operates, as will be explained more fully hereinafter to provide a coarse advance command, as shown in FIG. 1, when the correlator outputs fall in the $R_1$ region. Medium advance commands are provided when the correlator outputs fall in the $R_3$ and $R_5$ regions, and fine advance commands are provided when the correlator outputs fall in the $R_7$ region. Coarse, medium and fine retard commands are similarly obtained from the correlator outputs when the latter outputs respectively fall in the $R_2$, $R_4$, $R_6$, and $R_8$ regions.

The following table indicates the correlator outputs which, when taken at the end of the time base intercal, indicate the region $R_1$ through $R_8$ of required delay or advance of the receiver time base with respect to the signal element.

| Region | Correlator outputs | Time base adjustments |
|---|---|---|
| $R_1$ | $S_a$ negative; $C_a$ positive | Coarse advance. |
| $R_2$ | $S_a$ negative; $C_a$ negative | Coarse retard. |
| $R_3$ | $KS_a$ less than the absolute value of $C_a$; $C_a$ positive. | High medium advance. |
| $R_4$ | $KS_a$ less than the absolute value of $C_a$; $C_a$ negative. | High medium retard. |
| $R_5$ | $S_c$ less than the absolute value of $C_c$; $C_a$ positive; $C_c$ positive. | Low medium advance. |
| $R_6$ | $S_c$ less than the absolute value of $C_c$; $C_a$ negative; $C_c$ negative. | Low medium retard. |
| $R_7$ | $KS_a$ is greater than the absolute value of $C_a$; $S_c$ greater than the absolute value of $C_c$; $C_c$ positive. | Fine advance. |
| $R_8$ | $KS_a$ is greater than the absolute value of $C_a$; $S_c$ greater than the absolute value of $C_c$; $C_c$ negative. | Fine retard. |

Figure 8:
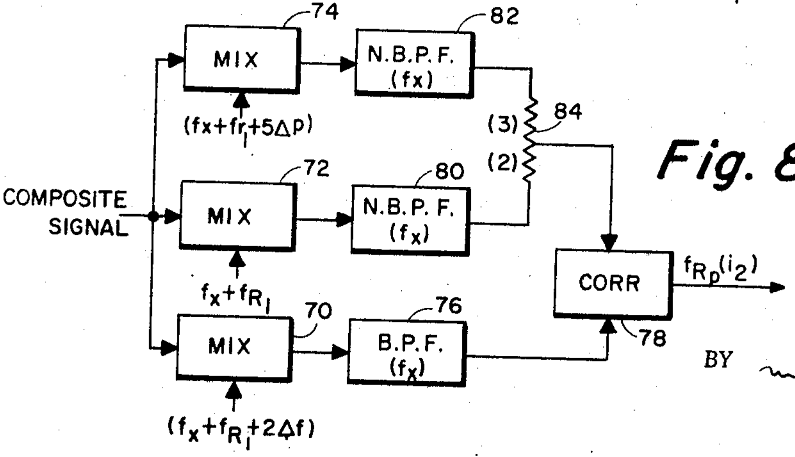
FIG. 8 is a block diagram, partially in schematic form, of a portion of the reference tone extraction circuits of FIG. 1.

Before discussing the operation of the decision circuits in connection with FIG. 2 of the drawing, the operation of the reference tone extraction circuits which extract tones for use in the correlators 30 (FIG. 1) in the information channel 16 will be described in connection with FIG. 8. By way of example, the reference tone extraction and correlator circuits for a particular information tone, $f_{12}$ shown in FIG. 7, is described. The reference tone extraction and correlation circuits for the other tones will be apparent from the described example.

The composite signal from the receiver 10 (FIG. 1) is applied to mixer circuits 70, 72, and 74 which heterodyne the composite signal with different signals from the function generator 28 (FIG. 1). The mixer 70 has applied thereto a signal from the function generator 28 having a frequency equal to the sum of (a) the frequency of the information tone which is desired and (b) the frequency at which the correlators are designed to operate. The latter frequency is the frequency $f_x$ which as mentioned above may be 1250 c.p.s. Accordingly, the function generator provides the mixer 70 with an input signal having a frequency equal to $(f_x+f_{R_1}+2\Delta f)$. The lower sideband of the output frequency of the mixer contains a component $f_x$ which carries the same phase modulation and the same information as the information tone $f_{i_2}$. This signal is extracted from the output of the mixer by means of a band pass filter 76 which is wide enough, say 300 c.p.s., to include the sideband components around $f_x$ which contain the information. The output of the filter 76 is applied to the correlator 78. The other information tones in the composite signal may similarly be translated to the common frequency $f_x$ and applied to the respective correlators. The correlator 78 is the sine correlator, the cosine correlator (not shown) also receives the filter 76 output. The reference tone $f_{R_1}$ is extracted by means of the mixer 72. A signal from the function generator having a frequency $(f_x+f_{R_1})$ is applied to the mixer 72 and heterodyned with the composite signal. A narrow band pass filter 80 extracts the lower sideband frequency component $f_x$. This component $f_x$ contains the same phase information as the reference tone $f_{R_1}$. The reference tone $f_{R_1}$ is not phase modulated in the transmitter. However, it may be subject to random phase errors because of multipath effects, for example in the course of propagation over the radio link or other transmission medium. The other reference tone $f_{R_5}$ is similarly derived by heterodyning in the mixer 74 with a tone from the function generator having a frequency $(f_x+f_{R_1}+5\Delta f)$. The common frequency component $f_x$ which contains the phase information of $f_{R_5}$ is derived by means of a narrow band pass filter 82 which is tuned to the frequency $f_x$.

It is desirable to correlate each information tone with a reference tone which is closely adjacent thereto in frequency and therefore tends to experience the same phase error or other variations in the course of transmission as the information tone. Accordingly, a phantom reference tone $$f_{R_{P(i2)}}$$

is derived from the reference tones corresponding to $f_{R_1}$ and $f_{R_5}$ by means of a potentiometer 84 which is connected between the outputs of the filters 80 and 82. Since the information tone $f_{i_2}$ is $(2\Delta f)$ c.p.s. higher frequency than the $f_{R_1}$ reference tone and $3\Delta f$ lower frequency than the $f_{R_5}$ reference tone, the correlator 78 is connected to a tap on the potentiometer 84 so that two-fifths of the resistance of the potentiometer is between the tap and the end of the potentiometer connected to the filter 80 and three-fifths of the resistance of the potentiometer is between the tap and the opposite end of the potentiometer which is connected to the filter 82. Since the resistor 84 is a linear device, the phase of the signal taken across the potentiometer varies; at one end of the potentiometer being equal to the phase of the reference tone corresponding to $f_{R_1}$ and at the other end of the potentiometer corresponding to the phase of the reference tone corresponding to $f_{R_5}$. The phantom reference tone is therefore similar to a reference signal which might have been transmitted at the same frequency as the information tone $f_{i_2}$. The phantom reference tone may be shifted in phase 90° and applied together with the filter 76 output to the cosine correlator (not shown).

Another phantom reference tone may be similarly generated for the information tone $f_{i_3}$. The reference tones $f_{R_1}$ and $f_{R_5}$ are close in frequency to the $f_{i_1}$ and $f_{i_4}$ tones. Accordingly, the output of the filter 82 may be applied to the correlator for the $f_{i_4}$ tone and the output of the filter 80 may be applied directly to the correlator for the $f_{i_1}$ tone. However, in the interest of greater accuracy, phantom reference circuits may be provided for all information tones. The phantom reference generating circuit eliminates the need for transmitting a reference tone between the $f_{R_1}$ and the $f_{R_5}$ tones. The phantom reference tones have substantially the same phase error as their corresponding information tones. The phantom reference generating circuits reduce the probability of errors in the demodulation of $f_{i_2}$ and $f_{i_3}$ due to phase errors in the course of transmission.

Returning to FIG. 2, circuits are provided for deriving outputs corresponding to the absolute value of the correlator outputs $C_a$ and $C_c$. The circuits include inverter amplifiers 90 and 92 and OR gates 94 and 96. Accordingly, a positive output will be provided by the OR gates when $C_a$ or $C_c$ are postive or negative, since the inverter inverts the polarity of negative voltage $C_a$ or $C_c$ outputs. The OR gate desirably has diodes in its input which only pass positive voltages applied thereto to the OR gate output.

The decision circuits 40 include five sample level detector circuits 98, 100, 102, 104, and 106. The sample level detectors 98 and 104 respectively determine whether the outputs $C_a$ and $C_c$ are positive or negative and thereby indicate whether advance or retard commands are needed. Sampling pulse inputs indicated SP are applied once each time base interval from the timing pulse generator 26 to be described in detail hereinafter.

Figure 5:
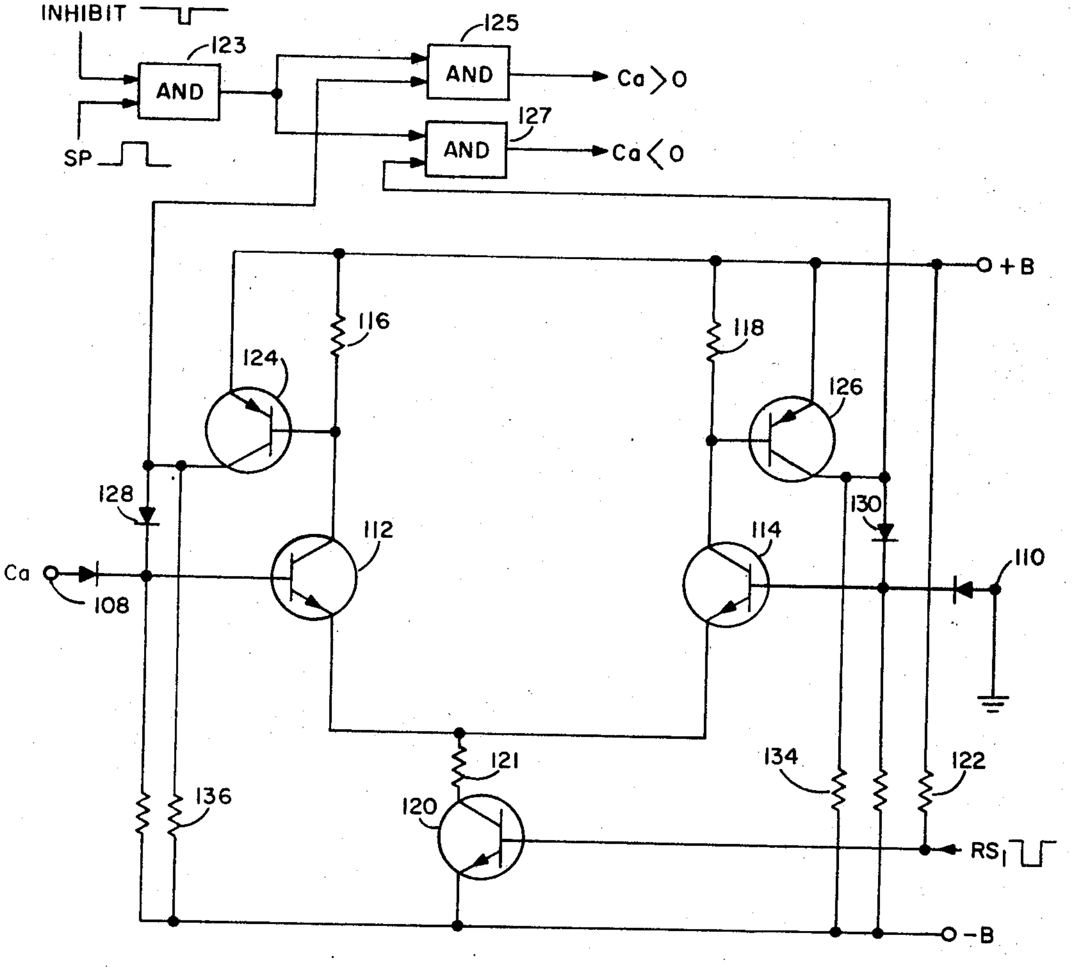
FIG. 5 is a circuit diagram of a sample level detector circuit of the type shown in FIG. 2.

The circuits of the sample level detector 98 are shown in FIG. 5, by way of example. The correlator output $C_a$ is applied to one input terminal 108 of the detector. The other input terminal 110 of the detector is referenced to zero voltage by being grounded. The input terminals 108 and 110 are connected to the bases of different transistors 112 and 114 respectively. The collectors of these transistors 112 and 114 are connected to a source of operating voltage indicated at +B through resistors 116 and 118, respectively. The emitters of these transistors are connected to an operating voltage source indicated at −B through a resistor 121 and a switching transistor 120 which is normally biased in the forward direction by a resistor 122 connected to +B and is therefore normally conducting. The collectors of the transistors 112 and 114 are connected in positive feedback relationship with their bases; the transistor 112 by means of a transistor 124 and a diode 128 and the transistor 114 by means of another transistor 126 and a diode 130.

An inhibit command in the form of a negative pulse may inhibit an AND gate 123 which controls the application of the sampling pulses (SP) to output AND gates 125 and 127. The inhibit command from a level detector circuit 131 (FIG. 2) which responds to the amplitude of one of the transmitted pilot tones, $f_b$ for example, by peak detecting that tone and driving a threshold circuit 133 which normally provides a positive level and which provides a negative inhibit pulse or level when the input thereto from the level detector 131 is below a certain amplitude.

At an instant just before the end of each time base interval, a reset pulse $RS_1$ is applied to the base of the transistor 120 and drives that transistor momentarily into its non-conductive state so as to reset the detector circuit. The circuit is re-established at the end of the reset pulse. The input conditions, i.e. $C_a$ greater than zero or $C_a$ less than zero, then set the detector circuit to reflect those conditions. If the input $C_a$ is greater than zero volts, i.e. positive, the $C_a$ voltage causes the transistor 112 to conduct more heavily. The emitter of the transistor thereby becomes more positive with respect to ground potential. This causes the transistor 114 to condut less heavily. The voltage at the base of the transistor 126 becomes more positive thereby reducing the voltage across the load resistor 134 of the transistor 126. The negative going voltage applied to the base of the transistor 114 tends to drive the transistor 114 to cut-off thereby causing the transistor 126 to cut off. The transistors 114 and 128 "lock-up" in their cut-off states until the next reset pulse opens the emitter-collector circuits thereof. Accordingly, if $C_a$ is greater than zero volts, the output of the detector taken at the collector of the transistor 126 is a negative level which lasts until the next reset pulse occurs.

If $C_a$ is greater than zero (positive), $C_a$ voltage drives the transistor 112 to saturation by virtue of regenerative feedback through the transistor 124 which is also driven to saturation. Accordingly, the output voltage across the load resistor 136 of the transistor 124, taken at the collector of the transistor 124, is a positive level which lasts until the next reset pulse.

Similarly when $C_a$ is negative, i.e. less than zero (ground) voltage, the transistor 112 is cut off and the transistor 114 is driven to saturation. Accordingly, the output at the collector of the transistor 126 will be a positive level and the output of the collector of the transistor 124 will be a negative level, both lasting until the next reset pulse.

The two outputs of the detector 98 are indicated in FIG. 2 as the $C_a$ greater than zero output and the $C_a$ less than zero output. These outputs appear at the AND gates 125 and 127. When $C_a$ is greater than zero the AND gate 125 is enabled and a sampling pulse is transmitted therethrough each time base interval. This output pulse will appear at the $C_a$ greater than zero output. Convserely, when $C_a$ is less than zero the AND gate 127 is enabled and a positive sampling pulse will appear at the $C_a$ less than zero output during each time base interval when the sampling pulse occurs.

The sample level detector 100 is similar to the sample level detector 98. The $S_a$ output of the correlator 54 is applied to one input of the detector 100 and ground is applied to the other input thereof. The detector 100 provides the two outputs which are positive pulses occurring on one or the other of the output lines respectively, when $S_a$ is greater than zero and when $S_a$ is less than zero, during a time base interval.

The sample level detector 102 has applied to one of its inputs the output of the OR gate 94 which corresponds to the absolute value of $C_a$. The output of the voltage divider which corresponds to $KS_a$ is applied to the other input of the detector 102. Accordingly, the output lines which are connected to the output terminals of the detector provide a positive pulse on occurrence of a sampling pulse; on one line, when $KS_a$ is less than the absolute value of $C_a$ and on the other line when $KS_a$ is greater than the absolute value of $C_a$. The output $C_c$ of the correlator 60 is applied to the sample level detector 104. Ground is applied to the other input of this detector 104. Accordingly, there appear on the output lines which are connected to the outputs of the detector 104 when the sampling pulse occurs, a positive pulse when $C_c$ is greater than zero and a positive pulse when $C_c$ is less than zero, respectively on different ones of the lines. Another sample level detector 106 provides positive pulse outputs when the sampling pulse occurs, when $S_c$ is greater than the absolute value of $C_c$ and on the other output line when $S_c$ is less than the absolute value of $C_c$. This sampling level detector 106 has provided on its inputs the $S_c$ output from the correlator 58 and the absolute value of $C_c$ output from the OR gate 96.

Noise and other propagation disturbances sometimes distort the pilot tone components $f_a$, $f_b$, and $f_c$ especially during their transmission over a long range radio link. Such noise distortion may cause erroneous outputs from the correlators 54, 56, 58 and 60 thereby causing the sample level detectors to provide pulses having the wrong polarity during the sampling pulse interval. To this end counters are provided which accumulate the output pulses of the sample level detectors 98, 100, 102, 104, and 106. A predetermined number, say three pulses must be accumulated before the counter provides an output which is then utilized in generating command signals for advancing or retarding the receiver time base. Noise signals may simulate abrupt phase shifts which may take place during one or two signal element intervals. Accordingly, the counters which require the accumulation of a certain number of output pulses from the sample level detectors are an effective guard against generation of erroneous signals by these detectors due to noise.

A counter is not connected to one of the channels 140 which carries the $C_a$ greater than zero and $C_a$ less than zero signals. This channel is used to directly indicate gross amounts of phase shift or delay which may be used immediately to correct the time base generator, as will be explained hereinafter. A reversible or "up-down" counter 142 is connected to another $C_a$ greater than zero, $C_a$ less than zero channel 144. This counter has a pair of output lines which may be connected to the final stages thereof. The counter counts upwardly in response to the $C_a$ greater than zero output pulses, the counter only being responsive to positive pulses, and downwardly in response to $C_a$ less than zero positive pulses. When a count of three in the $C_a$ greater than zero pulses direction is reached, the counter provides an output on its $C_a$ greater than zero output line. Similarly, the counter 142 provides an output on its $C_a$ less than zero output line, when a count of three in the $C_a$ less than zero direction is reached. Upon providing an output, the counter 142 resets itself to zero. Such reversible counters are well known in the art and will not be described in detail herein.

A similar reversible counter 146 is provided in a third $C_a$ greater than zero, $C_a$ less than zero channel 148. The outputs of the counter 146 are connected respectively to the set and reset terminals of a flip flop 150. Accordingly, the flip flop provides a "1" output, when the reversible counter provides a $C_a$ greater than zero output, and a "0" output, when the counter 146 provides a $C_a$ less than zero output. The flip-flop 150 therefore provides storage for the output of the counter 146 and continues to indicate the last counter output, whether $C_a$ greater than zero or less than zero, until the flip-flop 150 is updated by the next counter 146 output. This temporary flip-flop storage permits the system to continue to provide corrections in the same direction continuously. Since temporary storage is provided, corrections in the phase of the time base may be made on the last valid samples of the correlator outputs $C_a$ and $S_a$, $C_c$ and $S_c$.

A reset counter 152 is triggered by the $S_a$ less than zero pulses and reset by the $S_a$ greater than zero pulses. The counter provides an output when the predetermined number, say three, $S_a$ less than zero pulses are successsively counted. The counter then resets itself to zero. However, any $S_a$ greater than zero pulse also resets the counter to zero. The output of the $S_a$ less than zero counter 152 is not temporarily stored, since this output is used to make coarse (large) corrections in the time base phase. Several continuous coarse corrections would excessively advance or retard the phase of the time base. Accordingly, only the actual occurrence of $S_a$ less than zero counter 152 pulse is effective to provide a coarse correction as will be explained morefully hereinafter.

Two similar reset counters 154 and 156 are operated by the sample level detector 102. One of these counters is triggered by the positive pulse produced when $KS_a$ is less than the absolute value of $C_a$, and the other is triggered by the positive $KS_a$ greater than the absolute value of the $C_a$ pulse. The counter 154 is reset by the $KS_a$ greater than the absolute value of $C_a$ pulse, while the other counter 156 is reset by the $KS_a$ less than the absolute value of $C_a$ pulse. Accordingly, the counter 154 provides an output when a certain number, say three successive $KS_a$ less than the absolute value of $C_a$ pulses are counted, while the counter 156 provides an output when three successive $KS_a$ greater than the absolute value of $C_a$ pulse are counted. A flip flop provides storage for the counters 154 and 156 output pulses. The "1" output of the flip flop is positive when the flip flop 158 is set by the $KS_a$ less than absolute value of $C_a$ pulse. The flip flop 158 provides a positive "0" output when the $KS_a$ greater than the absolute value of $C_a$ output pulse is provided by the other counter 156.

A reversible counter 160 is provided which counts up when the sample level detector provides a positive pulse indicative of $C_c$ being greater than zero and counts down when a positive $C_c$ less than zero pulse is provided. The output of this counter 160 is stored in a flip flop 162.

Another reversible counter 164 is provided which is connected to the outputs of the sample level detector 106. Accordingly, the counter 164 counts up when a positive $S_c$ less than the absolute value of $C_c$ pulse is generated and counts down when a positive $S_c$ greater than the absolute value of $C_c$ pulse occurs. The $S_c$ greater than the absolute value of $C_c$ output of the counter is passed through an OR gate 166 and resets a flip flop 168 which provides temporary storage for the counter 164 output information. The OR gate 166 also receives an input when a low medium command is provided by the decision circuits via another OR gate 167 or when an $S_c$ greater than the absolute value of $C_c$ output is provided by the counter 164.

The generation of the correction commands is accomplished by means of the control circuits 42 (FIG. 1) which are made up of command signal generators 180 which are illustrated as four one-shot monostable multivibrators 182, 184, 186, and 188. Also included in the control circuits are several AND gates, four of which 190, 192, 194, and 196 provide outputs for different combinations of outputs from the counters and flip-flops in the decision circuits. In addition eight AND gates 198, 200, 202, 204, 206, 208, 210, and 212 are input connected to the command signal generators 180 and are enabled by the control signals from the counters and flip flops of the decision circuits or the AND gates 190, 192, 194, and 196 to provide different command signals which effect the coarse, medium and fine control of the receiver time base generator. The output lines from the AND gates 198, 200, 202, 204, 206, 208, 210, and 212 are respectively designated $R_1$, $R_2$, $R_3$, $R_4$, $R_5$, $R_6$, $R_7$ and $R_8$ to correspond with the region of time base correction, as shown in FIG. 3, for which the correction command signals are generated.

The one-shot multivibrators are triggered by the time base generator and provide pulses of different durations. The multivibrator 182 provides an output pulse having a duration equal to $T/N_1$ where T is equal to the duration of the receiver time base or $1/\Delta f_R$. A suitable number for $N_1$ may be four. The output of the multivibrator 182 is therefore a pulse having a duration which is equal to a fraction of the time base interval. The other multivibrators 184, 186, and 188 provide outputs which are pulses having durations which are still smaller fractions of the time base interval. The output pulse of the multivibrator 184 is equal to $T/N_2$ where $N_2$ may be 16. The output of the multivibrator 186 is a pulse of duration of $T/N_3$, where $N_3$ may be 32. The pulse at the output of the multivibrator 188 may have a still smaller duration, $T/N_4$ where $N_4$ may be from 64 to 128. The foregoing values for $N_1$, $N_2$, $N_3$ and $N_4$ are presented solely for purposes of example to illustrate that the commands for the coarse, medium and fine corrections of the receiver time base have durations which are successively smaller fractions of a time base.

The largest pulses of duration $T/N_1$ are applied to the AND gates 198 and 200 and provide the coarse corrections for phase relationships in the regions $R_1$ and $R_2$. The AND gate 198 is enabled by the positive output pulse from the sample level detector 98 which is produced when the control signal $C_a$ is greater than zero thereby indicating that the time base is delayed with respect to the signal element and the phase of the time base must be advanced. The positive pulse which is provided by the counter 150 for a predetermined number of successive positive pulses indicating that the control signal $S_a$ is less than zero must be coincident with a pulse from the detector 98 indicating that $C_a$ is greater than zero in order to enable the AND gate 198. Then, the coarse correction pulse of duration $T/N_1$ is applied to the time base generator for correction purposes. Similarly, the AND gate 200 is enabled when a $C_a$ less than zero pulse is provided by the sample level detector 98 concurrently with an output from the counter 152 indicating that $S_a$ is less than zero. As is apparent from FIG. 3 the $C_a$ less than zero pulse indicates that a correction to retard the time base is required, and the concurrent occurrence therewith of an $S_a$ less than zero pulse indicates that a coarse retard correction is required because the time base and the signal interval phase difference is sufficient to be in region $R_2$. Storage is not provided in the channel 140 for the $C_a$ greater than zero and $C_a$ less than zero pulses which are connected to the AND gates 198 and 200. No storage is provided at the output of the counter 152. Accordingly, only a single coarse correction will occur for each coincident $S_a$ less than zero pulse and a $C_a$ greater than zero or $C_a$ less than zero pulse. Storage is provided in the outputs of some of the other counters which are used to develop medium and fine correction pulses, since it is desirable to continue corrections in the same direction in the case of some medium and fine corrections as explained above. However, continued coarse corrections might cause an overshoot. Therefore a coarse correction is only commanded when indicated by the actual presence of the control signal pulses corresponding to $S_a$ or $C_a$ less than zero and $C_a$ greater than zero.

It will be apparent from the table presented above, FIG. 3 and the legends on the output lines of the AND gates 190, 192, 194, 196, and multivibrators 182, 184, 186, and 188 that correction commands in the form of pulses of duration of $T/N_2$, $T/N_3$ and $T/N_4$ are provided at the outputs of the AND gates 202, 204, 206, 208, 210, and 212 respectively when the relative delay of the time base and signal element are in the $R_3$, $R_4$, $R_5$, $R_6$, $R_7$, and $R_8$ regions. The AND gates 190 through 212 are operative to control the generation of the correction commands so that they occur only when the phase relationships of the time base and the signal element are in the requisite regions, $R_1 \ldots R_8$.

Figure 6:
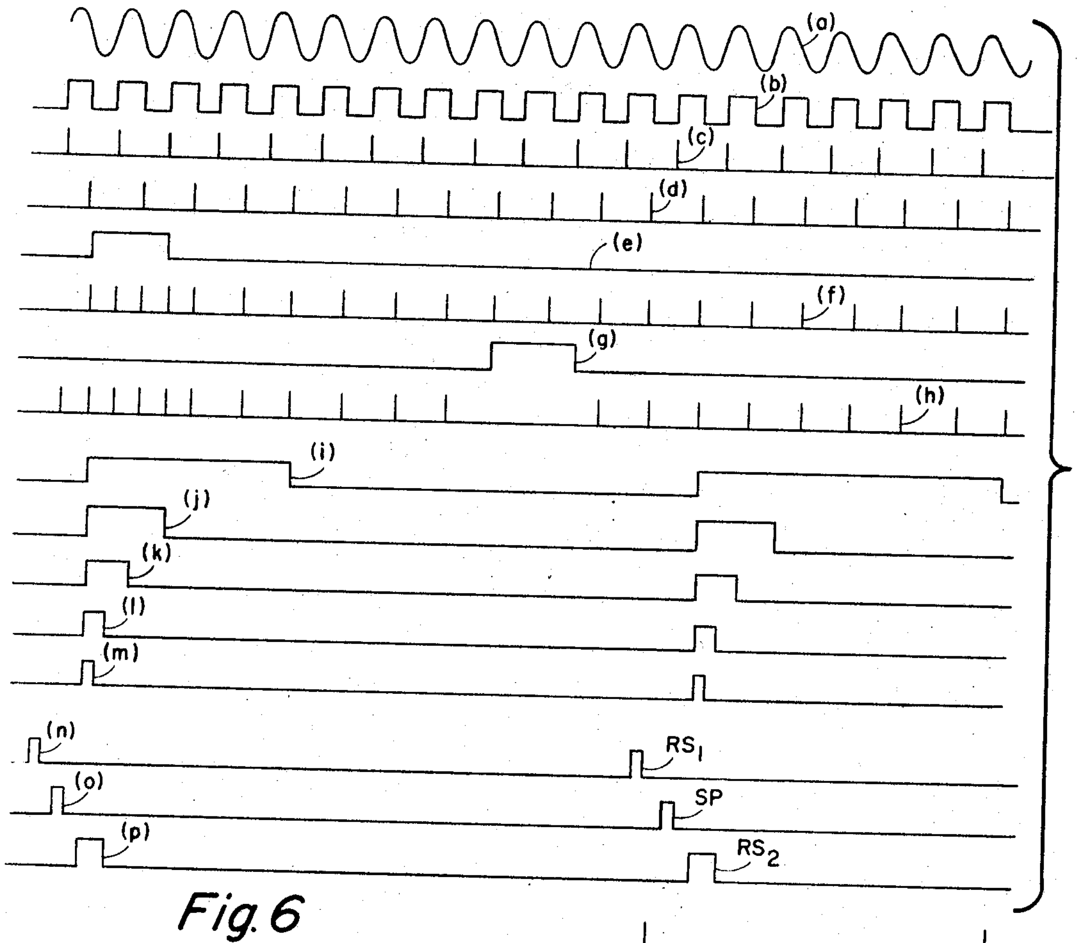
FIG. 6 is a series of waveforms which are illustrative of the portion of the system of FIG. 2 which generates and controls the receiving system time base.

The receiver timing and function generation 20 includes the frequency standard and frequency control circuits 24 which make up the time base generator which is illustrated in FIG. 2. Reference may be had to the waveforms shown in FIG. 6. The frequency standard provides an accurate sine wave signal, such as shown in waveform (*a*) of FIG. 6. The signal is highly stable in frequency and phase. A Schmitt trigger circuit 220 or any suitable pulse forming network translates the output of the standard into a square wave in accurate time relation therewith. The frequency of the signal from the frequency standard and, accordingly, the repetition rate of the square wave from the Schmitt trigger circuit 220 may suitably be 60 kc. p.s. The square wave pulse train is illustrated in waveform (*b*) of FIG. 6.

A differentiating circuit 222 which may include an amplifier is input connected to the Schmitt trigger and output connected to a pair of clipping circuits 224 and 226. An inverter circuit 228 such as an inverting amplifier inverts the output of the clipper 226. The clipper 224 operates to clip the positive going differentiated pulses to provide pulse trains shown in waveform (*c*) of FIG. 6. The clipper 226 and the inverter 228 provides positive pulses corresponding to the negative going differentiator output pulses. The latter pulses are illustrated in waveform (*d*). An AND gate 230 connects the clipper 224 to an OR gate 234. This OR gate normally passes the pulses in the pulse train (*d*) from the output of the inverting amplifier 228. An OR gate 236 is connected to another input of the AND gate 230. This OR gate 236 is input connected to the output lines designated $R_1$, $R_3$, $R_5$ and $R_7$ which provide the advance command pulses. Accordingly, when an advance command pulse such as a pulse on line $R_1$ of duration $T/N_1$, shown in waveform (*e*), is applied to the input of the OR gate 236, the AND gate 230 is enabled for the duration of the command pulse and OR gate 234 passes input pulses from the pulse train shown in waveform (*c*) as well as the pulse train shown in waveform (*d*). When no advance command pulses are applied to the OR gate 236, the AND gate 230 is inhibited. Accordingly, only the pulses from the waveform (*d*) pass through the OR gate 234. The output pulse train from the OR gate 234 is shown in waveform (*f*). It will be noted that the pulses in the pulse train of waveform (*f*) have twice the frequency during the advance correction command pulse interval than they have when the advance correction command pulses are not applied.

The output of the OR gate 234 is connected to an input of an AND gate 238 together with the output of an inverter 240 which is input connected to the output of an OR gate 242. The OR gate 242 receives the retard command pulses from the output lines designated $R_2$, $R_4$, $R_6$ and $R_8$. When on occurrence of a retard correction command pulse, such as the pulse of duration $T/N_1$ which appears on line $R_2$, is applied to the OR gate 242, this command pulse being shown in waveform (*g*) in FIG. 6, it is inverted in the inverter 240 and inhibits the AND gate 238 for the duration thereof. Accordingly, the output pulse train (waveform (*f*)) is interrupted during the retard command pulse interval.

Waveform (*h*) illustrates the pulse train at the output of the AND gate 238. The pulse train is applied to a binary frequency divider network indicated as the dividers 244 in FIG. 2. These dividers may be flip flop circuits which provide pulse trains of repetition rate from the rate of the time base $\Delta f$, say 25 p.p.s., to several thousand p.p.s. Pulse trains of selected frequency may be obtained at different flip-flops of the dividers and applied to the function generator 28 (FIG. 1). These pulse trains are indicated in FIG. 2 as having frequencies $f_1$ through $f_n$. It has been mentioned that the frequency standard may have a frequency of 60 kc. p.s. Accordingly, the nominal frequency of the pulse train (*h*) at the output of the AND gate 238 is half that of the frequency standard or 30 k p.p.s. Accordingly, a time base of 25 p.p.s. repetition rate is obtained by dividing the nominal frequency by 1200. The flip flops of the dividers 244 would be triggered every 600 pulses to provide the time base. Accordingly, by adding or subtracting pulses from the pulse train fed to the dividers in response to the correction commands, the leading and lagging edge of the time base may be shifted in time until the time base is synchronized with the signal element. The time base is illustrated in waveform (*i*) as resulting from the counting of 12 pulses of the pulse train (*h*). It will be observed that the addition of pulses in response to the advance command (waveform (*e*)) shorten the time between generation of successive time base pulses, whereas the retard command lengthens the time between the successive time base pulses thereby effectively delaying the time base.

The time base is applied to a delay circuit 246 which may be a R-C circuit included in an amplifier and is applied to a differentiator circuit 248. The positive going differentiator output pulses are clipped and amplified in a clipping amplifier 250 and used to trigger the one shot multivibrators thereby produce the command pulses illustrated in waveforms (*j*), (*k*), (*l*), and (*m*). The delay circuit delays the onset of these waveforms slightly in order to allow time for the operation of the counters and the flip flops in the decision circuits. However, this delay is not indicated in the waveforms. The sample level detector reset pulse $RS_1$ is generated by a one shot multivibrator 252 which operates successively and a predetermined time after the onset of the leading edge of a time base pulse, provide a short $RS_1$ reset pulse indicated in waveform (*n*). This pulse occurs near the end of the time base interval and provides the $RS_1$ pulses for the sample level detector 98–106 (FIG. 2). Since the time base interval is aligned with the signal element interval by virtue of the operation of the correction system described herein, these reset pulses also occur near the end of the signal element intervals. A sampling pulse (shown in waveform (*o*) and indicated in FIG. 2 and FIG. 5 as SP) is generated just after the reset pulse $RS_1$. This sampling pulse may be of about the same duration as reset pulse $RS_1$. In order to generate the sampling pulse an AND gate 254 is connected to suitable flip flops in the dividers 244. These flip flops may be chosen in accordance with known logic design techniques so as to provide an output square wave which starts just after the end of the rest pulse $RS_1$. The leading edge of this square wave triggers a one shot multivibrator 256 which provides the sampling pulse.

The correlator reset pulse $RS_2$ (waveform (*p*)) may be generated similarly to the reset pulse $RS_1$ by a one shot multivibrator not shown which is triggered by the sampling pulse. The pulse $RS_2$ occurs after the sampling pulse.

From the foregoing description it will be apparent that there has been provided an improved communication system which is operative to provide synchronization of a receiver with the transmitted signals that are received by that receiver. The invention also provides improvements which are generally applicable in communications systems such as the extraction of reference or pilot tones from the transmitted signals and means for providing immunity against noise. While the invention has been described as embodied in phase coded data communication system, it will be apparent that other communication systems as well as modifications in the illustrated communication system all of which embody the invention, will become apparent to those skilled in the art. Accordingly, the foregoing description should be taken merely as illustrative and not in any limiting sense.

What is claimed is:

1. A communication system for handling signals, successive elements of which follow one another, said systems comprising (a) means for deriving from said signals a plurality of tones which differ in frequency from each other by an integral multiple of a frequency having a period equal to a signal element interval, (b) means for locally generating at least one signal which has a component equal in frequency to the frequency difference of said tones and is an integral multiple of a frequency having a period equal to said signal element interval, (c) means responsive to said generated signal and one of said tones for deriving an output equal in frequency to at least another of said plurality of tones, and (d) means responsive to said output and said other of said plurality of tones for controlling the phase of said generated signal and to provide signals having periods synchronous with said signal element interval.

2. A communication system for handling signals transmitted from a transmitting point to a receiving point, successive elements of which transmitted signals follow one another, said system comprising (a) means at said receiving point for deriving from said signals a plurality of tones which differ in frequency from each other by an integral multiple of a frequency having a period equal to the interval of said elements of said transmitted signals, (b) means at said receiving point for generating at least one signal which has a component equal in frequency to the frequency difference of said tones and is an integral multiple of a frequency having a period equal to said signal element interval, (c) means responsive to said generated signal and said one tone for deriving an output equal in frequency to at least another of said plurality of tones, (d) means responsive to said output and said other of said plurality of tones for controlling the phase of said generated signal, and (e) means responsive to said generated signal for synchronizing said system at said receiving point with said elements of said transmitted signals.

3. A communication system for handling signals which are transmitted from a transmitting point to a receiving point successive elements of which transmitted signals follow one anoher, said system comprising (a) means at said receiving point for deriving from said signals a plurality of tones which differ in frequency from each other by an integral multiple of a frequency having a period equal to a signal element interval, (b) means at said receiving point for generating first and second signals which respectively have components equal in frequency to the differences in frequency between a third one of said plurality of tones and a first and second of said tones, (c) means responsive to said first and second signals and said first and second tones for deriving first and second outputs equal in frequency to said third tone, and (d) means responsive to said first and second outputs and said third tone for controlling the phase of said generated signals respectively to a relatively coarse degree and to a relatively fine degree.

4. A frequency differential communication system for handling signals including a plurality of signal components which differ in frequency from one another and successive elements of which signals follow one another, said system comprising (a) means for deriving from said signals a plurality of tones which differ in frequency from each other by an integral multiple of a frequency having a period equal to a single element interval, (b) means for generating a plurality of signals which differ in frequency from each other by the frequency difference of said tones, each of said generated signals corresponding to a different one of said tones and each being an integral multiple of a frequency having a period equal to said signal element interval, (c) means responsive to said plurality of generated signals and said plurality of tones corresponding thereto for deriving a corresponding plurality of outputs equal in frequency to each other, and (d) means for separately correlating the one of said plurality of outputs corresponding to the lowest frequency one of said generated signals with the outputs corresponding to the next higher ones of said generated signals for deriving signals which are functions of the phase difference between said signals element and a signal corresponding to one of said plurality of generated signals divided to have the same frequency as said signal element.

5. A receiving system comprising (a) means for receiving transmitted signals which are separated by a difference frequency which is an integral multiple of a predetermined frequency, (b) means responsive to a control signal for deriving from said transmitted signals, at intervals which are related to thte period of said difference frequency, the information carried by said signals, (c) means for generating said control signal comprising (1) means for deriving from said transmitted signals a plurality of tones each separated from each other by said difference frequency, (2) a source of signals having frequencies which are functions of said difference frequency, (3) means for mixing a signal from said source and one of said tones for deriving a signal having a phase angle which is a function of the phase angles of said source signal and said tone, (4) means responsive to said signal from said mixing means and another of said tones for deriving an output which is a function of the phase difference between said tones and said signal from said source at said difference frequency, (5) means responsive to said output for controlling the phase of said source signal, and (6) means for deriving said control signal from said source.

6. A receiving system comprising (a) means for receiving transmitted signals which are separated by a predetermined difference frequency, (b) means responsive to a control signal for deriving from said transmitted signals, at intervals, equal to the period of said difference frequency, the information carried by said transmitted signals, (c) means for generating said control signal comprising (1) means for deriving from said transmitted signals a pair of tones each separated by said difference frequency, (2) a time base generator for providing a signal having a frequency of which said difference frequency is a factor, (3) means for mixing said signal from said generator and at least one of said tones for deriving a signal having a phase angle which includes the phase angles of said time base generator signal and said tone, (4) means responsive to said signal from said mixing means and the other of said tones for deriving outputs which are function of the sine and cosine of the phase difference between said transmitted signals and said time base generator signal at said difference frequency, (5) means responsive to said output for controlling the phase of said source signals, and (6) means for deriving said control signal from said source.

7. A receiving system comprising (a) means for receiving transmitted signals which are separated by certain difference frequency, said signals having successive elements which occur at said difference frequency, (b) means responsive to a time base signal for deriving from said transmitted signals, at intervals which are related to the period of said difference frequency, the information carried by said signals, (c) a time base generator for generating said time base signal comprising (1) means for deriving from said transmitted signals three tones a first and second of which are separated from each other by said difference frequency and said first and third of which are separated from each other by *n* times said differencef requency, where *n* is greater than one, (2) means included in said time base generator for generating signals having frequencies which differ from each other by said difference frequency, and *n* times said difference frequency, (3) means for mixing said signals from said last-named means and at least said second and third of said tones for deriving signals having phase angles which are functions of the phase angles of said source signal and said tone, (4) correlators responsive to said signals from said mixing means and said first of said tones for deriving outputs which are sines and cosines of the phase difference between said time base signal and signal corresponding to the said successive elements of said transmitted signals which occur at said difference frequency and to the phase difference of signals corresponding to said time base signal and said transmitted signal element signal having a frequency $n$ times greater thereas, and (5) means responsive to said outputs for controlling the phase of said time base signal.

8. A receiving system comprising (a) means for receiving transmitted signals which are separated by a difference frequency and successive elements of which reoccur at said difference frequency, (b) means responsive to a time base signal for deriving from said transmitted signals, at intervals which are related to the period of said difference frequency, the information carried by said transmitted signals, (c) a time base generator for generating said time base signal comprising (1) a source of reference frequency signals of frequency signals of frequency greater than said difference frequency, (2) means operated by command signals and responsive to said reference frequency signals for providing an output signal of higher frequency and of lower frequency thereas, (3) means responsive to said output signal for providing said time base signal, (4) means for deriving from said transmitted signals a pair of tones separated from each other by said difference frequency, (5) means included in said time base generator for providing signals having frequencies which differ from each other by said difference frequency, (6) means for mixing at least one of said last-named signals and one of said tones for deriving a signal having a phase angle which is a function of the phase angles of said last-named signal and said one tone, (7) means responsive to said signal from said mixing means and the other of said tones for deriving outputs which are a function of the sine and cosine of phase difference between said time base signal and a signal corresponding to said reoccurring signal elements, and to said reoccurring signal elements, and (8) means responsive to said sine and cosine outputs for providing said command signals.

9. The invention as set forth in claim 8 including (a) a plurality of circuits triggered by said time base signal for providing a plurality of pulses of different duration during each time base signal period, and (b) means including gate circuits responsive to said sine and cosine outputs for selectively applying said pulses as said command signals to said command signal responsive means.

10. In a system for receiving information from transmitted signals which have a number of different frequencies separated by a difference frequency which is an integral multiple of a predetermined frequency, which signals occur in elements which represent different items of information said elements being repetative at said difference frequency, a system for synchronizing the receiving system with the transmitted signal elements comprising (a) means for deriving from said transmitted signals a plurality of tones of different frequencies which are separated by an integral multiple of said difference frequency, (b) synchronizing signal generating means for providing a signal at said difference frequency for synchronizing said receiving system and signals having frequencies which are separated by an integral multiple of said difference frequency, (c) means responsive to said generated signals and said tones for providing outputs which are different functions of the phase relationship of said transmitted signal elements and said generated signal at said difference frequency, (d) means operated by said outputs for providing signals indicative of the phase displacement between said signal elements and said generated signal at said difference frequency, and (e) means responsive to said phase displacement indicative signals for controlling said synchronizing signal generating means.

11. The invention as set forth in claim 10 wherein said means operated by said outputs comprises (a) means for sampling said outputs during each period of said generated signal at said difference frequency for providing pulses representing the amplitudes of said outputs, and (b) means for counting said pulses for providing said phase displacement indicative signals in response to predetermined counts of different ones thereof.

12. The invention as set forth in claim 11 wherein said counting means includes (a) a plurality of counters for counting in the opposite directions respectively in response to certain ones of said pulses, (b) a plurality of reset counters for counting in one direction in response to certain of said pulses, said reset counters being resettable in response to certain others of said pulses, and (c) a plurality of flip-flops coupled to different ones of said counters for providing storage for the outputs thereof.

13. The invention as set forth in claim 10 wherein said means operated by said outputs includes a plurality of circuits for individually translating said outputs into digital signals, each of said circuits comprising (a) a plurality of amplifier devices each having a con-control electrode and a pair of output electrodes which define a current path therethrough, (b) a first pair of said devices having their output electrodes connected in parallel with each other, (c) said parallel connected output electrodes of said first pair of devices being connected in series with another of said plurality devices through the current path established between the output electrodes of said last-named device, (d) a second pair of said plurality of devices being connected in feedback relationship respectively between one of the output electrodes and the control electrode of different devices of said first pair of devices, (e) means for applying at least one of said outputs to one of the input electrodes of said first pair of devices, (f) means opertive to bias said series connected one of said devices into a state of conduction, and (g) means operated by said synchronizing signal generating means for rendering said series connected one of said devices non-conductive at least once during the period of said signal at said difference frequency which is provided by said synchronizing signal generating means.

14. The invention as set forth in claim 10 wherein said means operated by said outputs includes a plurality of circuits for repetitively translating said outputs into digital signals of one of two opposite values depending upon the amplitude relationships of said outputs, said circuits each comprising (a) a first pair of transistors having base, emitter and collector electrodes, (b) a third transistors having base, emitter and collector electrodes, (c) means for separately connecting each of said first pair of transistors to said other transistor for providing separate paths for current flow in the same direction through the emitter and collector of different ones of said first pair of transistors and a common path for current flow through the emitter and collector of said third transistor, (d) a second pair of transistors each having a base, an emitter and a collector, (e) means for separately connecting the base of different ones of said second pair of transistors to one of the emitter and collector of different ones of said first pair of transistors, (f) means for connecting one of the collector and emitter for different ones of said second pair of transistors to one of the emitters and collector of different ones of said first pair of transistors, (g) means for biasing all of said transistors in the forward direction, (h) means for separately applying different ones of said output signals to the base of at least one of said first pair of transistors, and (i) means operated by said synchronizing signal generating means for repetitively applying pulses to the base of said third transistor for rendering said third transistor non-conductive at a predetermined instant during the period of said generated difference frequency signal.

15. A system for receiving signals which are transmitted synchronously, in elements at a predetermined frequency, said system comprising (a) a time base generator for providing signals having said predetermined frequency, (b) means for deriving from said transmitted signals a plurality of tones which are separated by an integral multiple of said predetermined frequency, (c) means included in said time base generator for providing signals which differ in frequency by an integral multiple of said predetermined frequency, and (d) frequency translating means responsive to said signals from said last named means and to said tones for providing signals of like frequency, (e) means for correlating said frequency translating means like frequency signals with each other for deriving outputs which correspond to the sine and cosine of the phase difference between said time base generator signal of predetermined frequency and the elements of said transmitted signals, (f) means operated by said time base generator and resposnive to the relative levels of said outputs at intervals equal to the period of said time base generator signal of predetermined frequency for deriving digital outputs representing the degree of phase displacement between said time base generator signal of predetermined frequency and said elements of said transmitted signals, (g) phase control means included in said time base generator responsive to said digital signals for reducing the phase difference between said time base generator signal of predetermined frequency and said elements of said transmitted signals, and (h) means synchronized by said time base generator for derving information from said transmitted signals.

16. The invention as set forth in claim 15 wherein said correlating means comprises a plurality of correlating circuits, each of said circuits comprising (a) a bridge circuit having a plurality of arms, (b) a different uni-directional current translating device in each of said arms, (c) means for applying one of said signals of like frequency across a first diagonal of said bridge, (d) means for applying another of said signals of like frequency across a second diagonal of said bridge opposite said first diagonal, (e) an integrating circuit including a resistor and a capacitor, (f) means for connecting said integrating circuit effectively across one of said first and second diagonals of said bridge, and (g) means operated by said time base genator for discharging said capacitor once during each period of said time base generator signal of said predetermined frequency.

17. The invention as set forth in claim 15 wherein said means for deriving information from said transmitted signals comprises (a) means included in said time base generator for providing a plurality of signals having frequency spacings corresponding to the frequency spacings of said transmitted signals, (b) means for mixing said signals from said last-named means separately with said transmitted signals for providing a plurality of signals of like frequency each corresponding to different ones of said transmitted signals, (c) means for combining a pair of the signals provided by said mixing means which correspond respectively to first and second of said transmitted signals of greater and lesser frequency than a third of said transmitted signals for providing a phantom signal, and (d) means including a correlator circuit responsive to said phantom signal and said signal of like frequency corresponding to said third transmitted signal for deriving the information carried by said third transmitted signal.

18. A system for receiving signals which are spaced from each other by a predetermined frequency and which are transmitted synchronously in elements which are repetitive at said frequency, said system comprising (a) time base generator means for providing signals having a said predetermined frequency, (b) means for deriving from said transmitted signals three tones, a first and a second of which are separated by said predetermined frequency, and a third and said first of which are separated by a frequency equal to an integral multiple of said predetermined frequency, (c) means included in said time base generator for providing signals separated in frequency by said predetermined frequency and by said integral multiple frequency, (d) frequency translating means responsive to said signals from said last-named means and to said tones for providing first, second and third signals of like frequency respectively corresponding to said first, second and third tones, (e) means for shifting said first signal in phase by ninety degree (90°), (f) two pairs of means for correlating said first signal with said second signal and with said third signal, said first signal being applied to each correlating means of one of said pairs, and said first signal shifted in phase in said phase shifting means being applied to each correlating means of the other of said pairs of correlating means, said two pairs of correlating means providing two pairs of outputs which respectively are functions of the sine and cosine of the phase difference between said time base generator signal of predetermined frequency and said elements of said transmitted signals, (g) means responsive to level of said outputs at intervals equal to the period of said time base generator signal of predetermined frequency for deriving digital outputs representing the degree of phase displacement between said time base generator signal of predetermined frequency and said elements of said transmitted signals, and (h) phase control means included in said time base generator responsive to said digital signals for reducing the phase difference between said time base generator signal of predetermined frequency and said elements of said transmitted signals, and (i) means synchronized by said time base generator signal of predetermined frequency for deriving information from said transmitted signals.

References Cited

UNITED STATES PATENTS

| | | | |
|---|---|---|---|
| 2,855,506 | 10/1958 | Schabauer | 325—320 |
| 3,195,049 | 7/1965 | Altman et al. | 325—346 X |

ROBERT L. GRIFFIN, *Primary Examiner.*

WILLIAM S. FROMMER, *Assistant Examiner.*

U.S. Cl. X.R.

178—67, 69.5; 325—58, 60, 61, 305, 346